United States Patent
Johnson et al.

(10) Patent No.: US 7,993,726 B2
(45) Date of Patent: Aug. 9, 2011

(54) MATTING PRODUCT

(75) Inventors: Paul R. Johnson, Brentwood, TN (US); Robert E. Johnson, Hendersonville, TN (US)

(73) Assignee: Johnson Technologies Corporation, Nashville, TN (US)

( * ) Notice: Subject to any disclaimer, the term of this patent is extended or adjusted under 35 U.S.C. 154(b) by 0 days.

(21) Appl. No.: 11/337,803

(22) Filed: Jan. 24, 2006

(65) Prior Publication Data

US 2006/0177626 A1    Aug. 10, 2006

Related U.S. Application Data

(60) Provisional application No. 60/645,619, filed on Jan. 24, 2005.

(51) Int. Cl.
- *B32B 3/00* (2006.01)
- *B32B 3/06* (2006.01)
- *B32B 7/00* (2006.01)
- *B32B 7/02* (2006.01)
- *F16B 5/00* (2006.01)

(52) U.S. Cl. .............. 428/101; 15/215; 15/217; 428/33; 428/52; 428/98; 428/100

(58) Field of Classification Search .................... 428/99, 428/98, 101, 33, 52, 138, 223; 15/215, 217; 40/600; 135/262.5
See application file for complete search history.

(56) References Cited

U.S. PATENT DOCUMENTS

| | | | |
|---|---|---|---|
| 2,721,818 A | | 10/1955 | Dolnick et al. |
| 2,810,671 A | * | 10/1957 | Taylor ............................ 428/33 |
| 3,234,577 A | * | 2/1966 | Mann, Jr. ........................ 15/217 |
| 4,564,546 A | * | 1/1986 | Jones ................................ 428/81 |
| 5,848,830 A | * | 12/1998 | Castle et al. .................... 362/84 |
| 6,250,001 B1 | * | 6/2001 | Gillespie ........................ 40/600 |
| 6,589,631 B1 | * | 7/2003 | Suzuki et al. ................. 428/172 |
| 2002/0114926 A1 | * | 8/2002 | Malpass et al. ............... 428/156 |
| 2004/0261209 A1 | * | 12/2004 | McKay ........................... 15/215 |

OTHER PUBLICATIONS

International Search Report, PCT/US06/02402.

* cited by examiner

*Primary Examiner* — Brent T O'Hern
(74) *Attorney, Agent, or Firm* — David W. Carrithers; Carrithers Law Office, PLLC

(57) ABSTRACT

A matting construction includes a multilayer thickness for supporting at least a user thereon, the multilayer thickness may have an outer layer which enables a user to ambulate without slipping thereon; a compressible layer for absorbing at least a portion of the weight of the user, and a peripheral frame member disposed between the outer layer and the compressible layer. The peripheral frame member may be disposed at an angle from the horizontal and the frame member is fixedly attached between the outer layer and the compressible layer.

19 Claims, 9 Drawing Sheets

MATTING PRODUCT

CROSS REFERENCE TO RELATED APPLICATIONS

This application claims the benefit of priority to U.S. Provisional Patent Application No. 60/645,619, filed Jan. 24, 2005 in which the contents are incorporated by reference.

FIELD OF THE INVENTION

The present invention generally relates to a floor matting product and, in particular, to a semi-flexible anti-fatigue matting product for use in various environments.

BACKGROUND

According to occupational therapy doctors, a person standing at a static or limited range position at a workstation for prolonged periods of time may have significant cumulative trauma or other injury, such as musculoskeletal fatigue, or inhibited circulation. Further, when a person's body is unsupported, the muscles around the joints and spinal bones may tire quickly due to constant strain and stress. The skeletal structure of the limbs and the back of the human body has a difficult time maintaining an awkward or compressed posture at an improperly positioned workstation or an unsupported or uninsolated situation. The awkward posture can contribute to undesirable musculoskeletal discomfort and fatigue or inhibited circulation, such as tendonitis or arthritis, as well reduced worker productivity and diminished quality.

Bunching and edge curling of past matting designs created tripping hazards in many settings, including occupational environments. Therefore, these problems are a top recordable complaint in occupational settings. Past matting was commonly taped to the floor around the periphery to reduce movement resulting in extra manhours and housekeeping concerns. Alternatively, the past matting was glued to the floor making it a permanent one-time use product. Other mats were fastened to the floor via bolts or screws. This causes tripping hazards for personnel stepping on the hidden bolt studs and the like.

Thus, there is a need for an effective solution to overcome these problems, as well as other problems.

SUMMARY OF THE INVENTION

In view of the foregoing, the present invention is generally directed to a matting product for use in various locations, including occupational areas.

In one aspect, a matting construction includes a multilayer thickness for supporting at least a user thereon, the multilayer thickness may have an outer layer which enables a user to ambulate thereon; a compressible layer for absorbing at least a portion of the weight of the user, and a peripheral frame member disposed between the outer layer and the compressible layer.

In one aspect, a floor matting construction includes a multilayer thickness for supporting at least a user thereon. The multilayer thickness may have a non-slip outer layer that enables a user to ambulate thereon, a compressible layer that is tapered about a least a portion of a periphery thereof, and a peripheral frame member disposed upon at least the to eared peripheral portion of the compressible layer at an angle from the horizontal, wherein the frame member is fixedly attached between the outer layer and the compressible layer.

In one aspect, a matting construction includes an air bonding means for a floor surface. The matting construction may have a multilayer thickness with an outer layer that enables a user to ambulate thereon, a compressible layer, and a peripheral frame member fixedly attached between the outer layer and the compressible layer.

In another aspect, a matting construction is provided with a first resilient foam core product that can be provided as a rolled good product which provides a rigidity to serve as a temporary or semi-permanent flooring system.

In another aspect, a method of manufacturing a matting product includes providing a first matting product having an outer layer enabling a user to travel thereon, a resilient layer for absorbing at least a portion of the weight of the user, and a frame member disposed on the resilient layer at one end and joining a second matting product to the first matting product at the end.

The above and other aspects, features and advantages of the present invention will be readily apparent and fully understood from the following detailed description of preferred embodiments, taken in connection with the appended drawings.

BRIEF DESCRIPTION OF THE DRAWINGS

The foregoing overview, as well as the following detailed description, is more understood when read in conjunction with the accompanying figures, which are included by way of example and not by way of limitation with regard to the inventions wherein.

DETAILED DESCRIPTION

Figure 1:
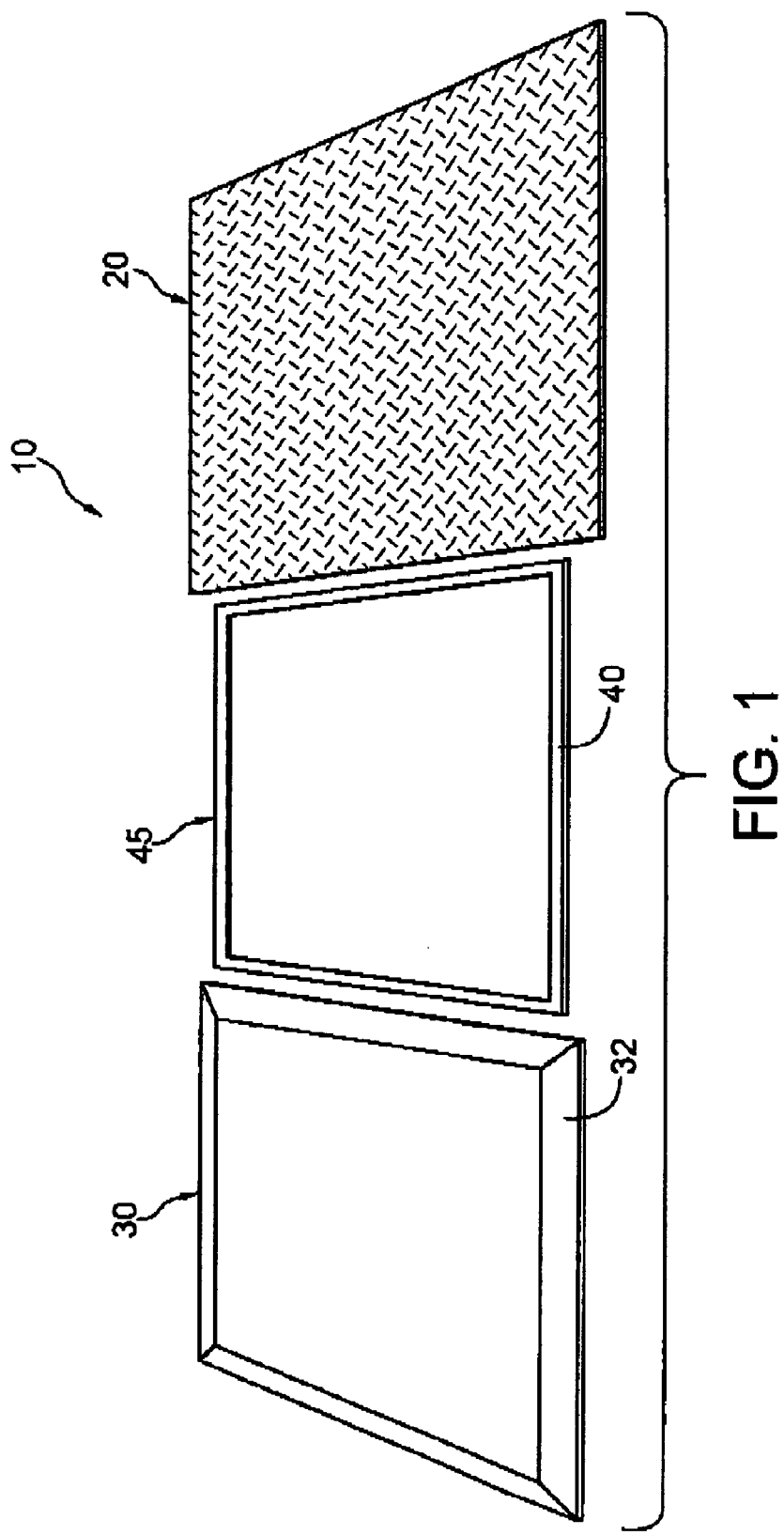
FIG. 1 is an exploded assembly view of one construction of a matting product according to the teachings of the present invention.
Figure 2:
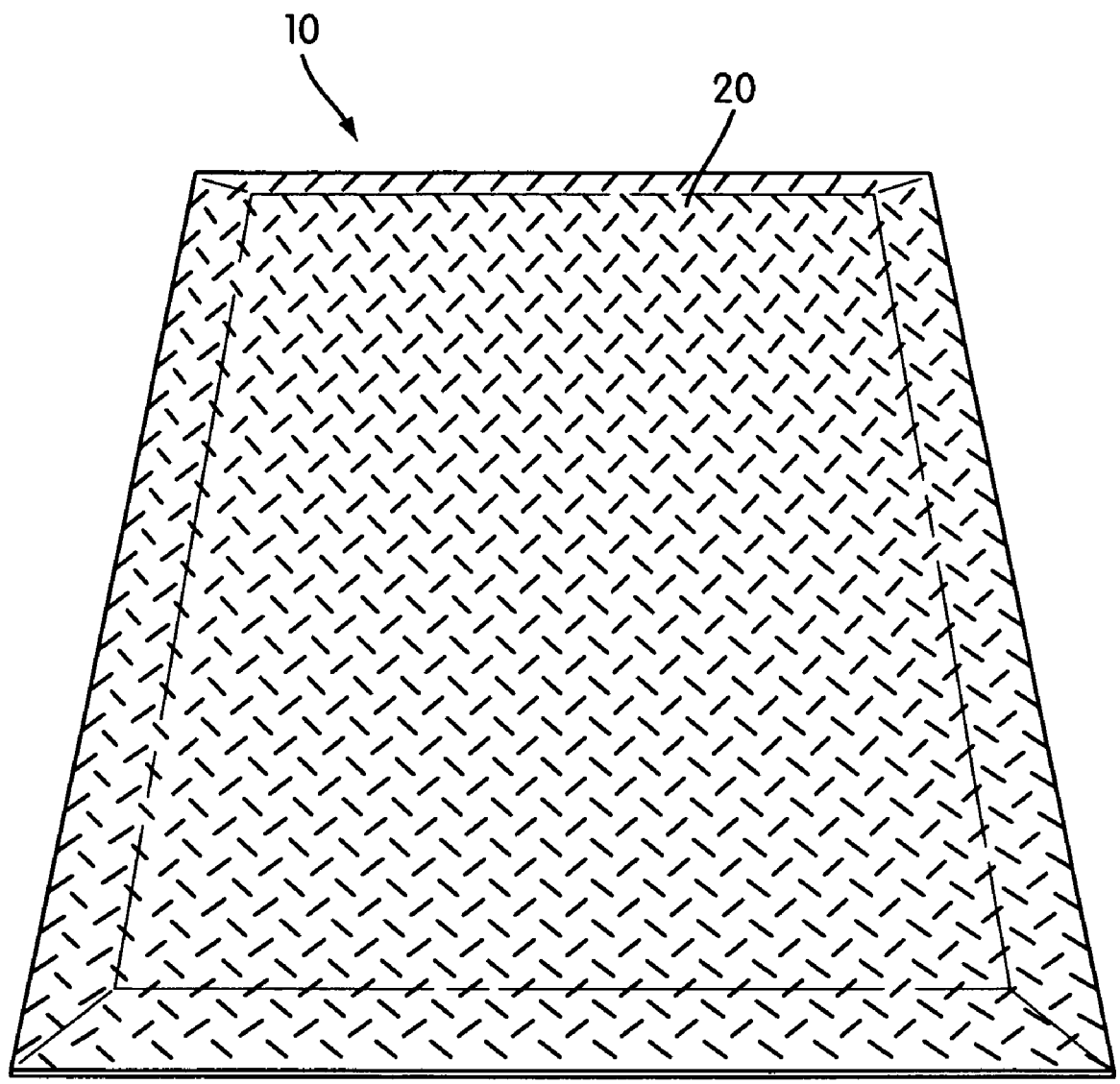
FIG. 2 is a perspective view of the matting product of FIG. 1 in an assembled state.

FIGS. 1-5 illustrate various aspects and features of an innovative anti-fatigue matting product 10 denoted as herein as a "matting." Referring to FIG. 2, in one construction, matting 10 prevents hydroplaning in wet operating environments, lateral shifting (side-to-side movement) or wiggle, thereby increasing safety in occupational locations or in other places. Matting 10 prevents edge roll-up, edge curl-up, or interior bunch-up when deployed so as to enhance productivity of workers, minimize housekeeping and vastly improves safety. In one construction, matting 10 includes curved or concave underside which provides a suction function to "hug" a floor surface, such as a concrete floor, thereby providing consistent sure footed traction of a human body walking or otherwise moving on the matting. In one construction, matting 10 includes a peripheral frame structure 45 which prevents tears or warping. Unless otherwise noted, matting 10 may be constructed from conventional materials.

Figure 3:
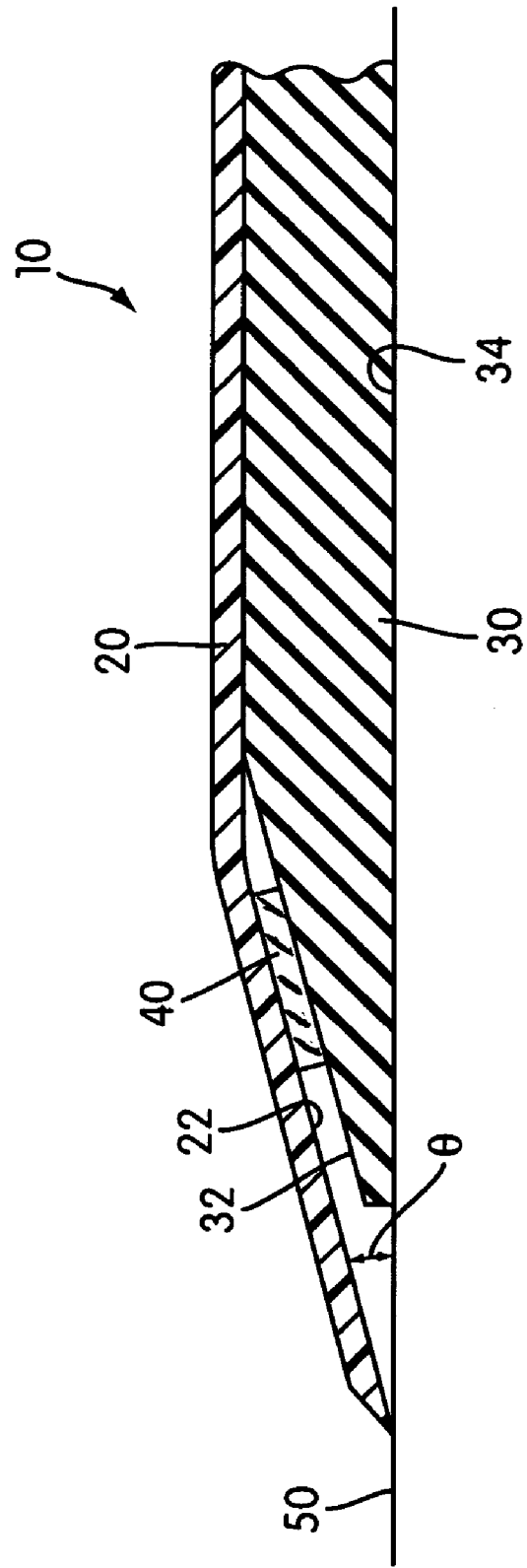
FIG. 3 is a portion of a section view of the matting product of FIG. 2 according to the teachings of the present invention.
Figure 4:
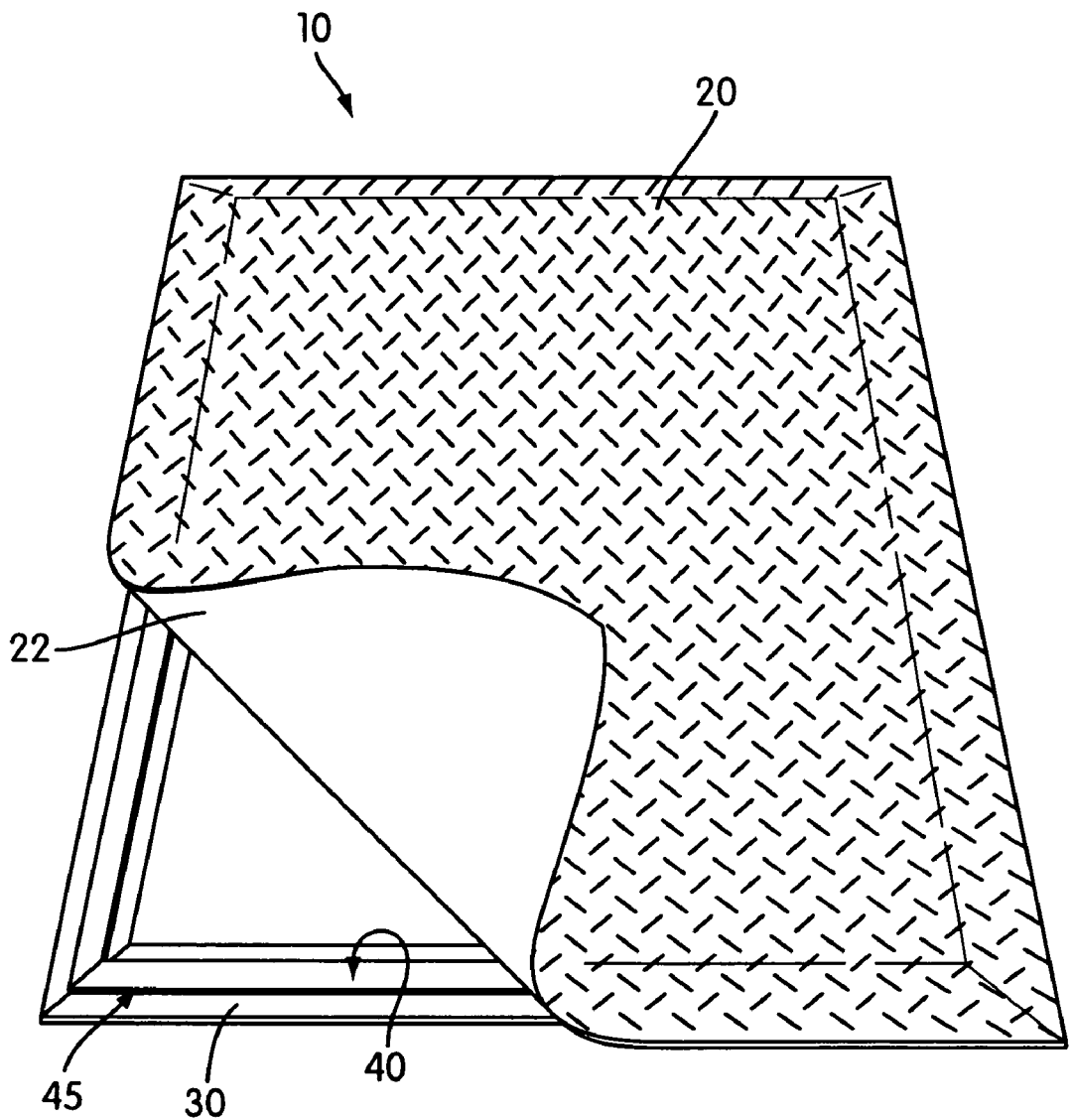
FIG. 4 is a perspective view of the interior components of the matting product with a portion of the outer layer moved to illustrate various interior components and physical relationships.
Figure 5:
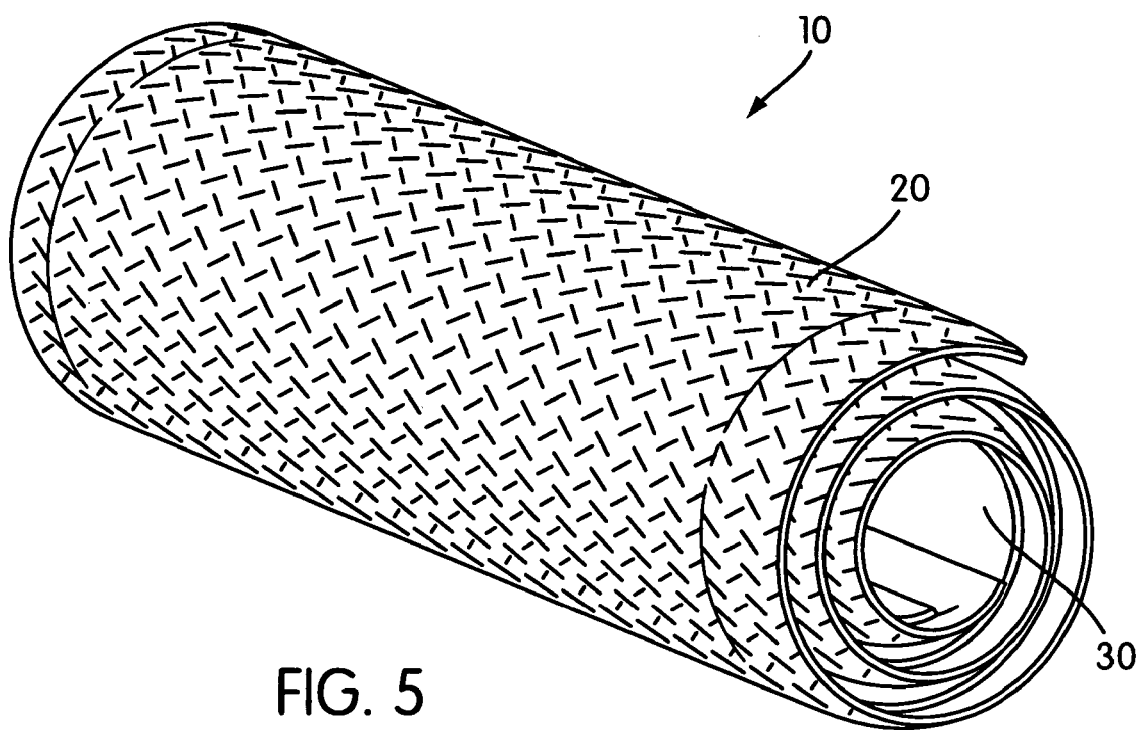
FIG. 5 is a perspective view of the matting product in one rolled state.

Referring to FIGS. 1-5, matting 10 can be deployed to roll up for long runways upwards of thirty linear feet or more and can be rolled up for practical shipping and for cleaning by the end user (see FIG. 5). As shown in FIGS. 2-3, the innovative construction keeps the matting 10 lying generally flat on a floor surface while deployed for use. This is in contrast to past anti-fatigue matting which starts curling, and bunching up, when used, which causes premature wear and tear; and causes tripping hazards for individuals.

In one construction as seen in FIGS. 1, 3 and 4, a matting 10 includes a multilayer thickness for supporting at least a human body thereon, the multilayer thickness may have a non-slip outer layer 20, a compressible layer 30; and a peripheral frame member (spine) 40 disposed between the outer layer 20 and the compressible layer 30. The non-slip outer layer 20 may includes protrusions, abrasive surfaces, such as silica coating, or patterns, such as diamond tread. This non-slip outer layer 20 serves as the contact point of the user standing or moving on the matting 10. Nonetheless, a user may ambulate on the outer layer 20 without slipping under normal use. Compressible layer 30 can absorb a portion of the weight of a user on the matting 10 to help reduce standing fatigue.

In a preferred construction, the peripheral spine 40 defines a flexible performance framework 45 of the matting 10 (see FIGS. 1 and 3, 4). In one aspect, the performance framework 45 advantageously enables long runs of the matting 10 to be stationary thereby preventing "snaking" or "shifting" of the matting when deployed on a floor surface. This innovative construction also prevents the edges 12 of the matting 10 from warping or coming up off the floor surface. Additionally, the innovative construction of matting 10 with the performance framework prevents bunching up, or rolling up thereby significantly reducing safety hazards in the workplace. This construction solves the warping and hazard problems which are a significant source of complaints and recordable safety hazards of conventional anti-fatigue matting.

Referring to FIGS. 3 and 4, in a preferred construction of matting 10, a semi-rigid strip of plastic material 40, such as vinyl or other appropriate material, is bonded inside the perimeter and to the underside 22 of the outer/top layer 20 of vinyl material and to the top side of the tapered edge 32 of the next sponge layer 30. The top vinyl 20 material is more flexible or able to bend more than the strip 40 of material. Advantageously, the strip 40 provides rigidity to the top layer 20 of material. In one construction, the strip 40 can be approximately ⅛ inch thick and have a width of about ½-¾ inch. Nevertheless, other dimensions of possible. In the most preferred construction, the sponge layer 30 is tapered to direct the edge of the top vinyl surface 20 to the floor 50. Concurrently, the rigid vinyl strip 40 is not parallel to the floor 50, but at an angle .theta. generally equal to the angle of the tapered sponge inner layer edge 32. The angle .theta. may be range from 2 degrees to 45 degrees from the horizontal. Alternatively, the angle .theta. may be range from 10 degrees to 30 degrees from the horizontal. Nevertheless, other values are possible, such as 31 degrees to 42 degrees. Thus, this angle of construction of matting 10 together with the flexible top material which bends more than the rigid strip around the periphery creates a suction-like pressure which enables the edge of the matting 10 to adhere to a floor surface 50, such as a concrete floor, thereby providing consistent sure footed traction of a human body walking or otherwise moving on the matting 10. In this manner, a matting construction includes an air bonding function to maintain a stationary position during use on a floor surface.

More particularly, the matting product, as shown in FIGS. 1 and 4, is a multilayer matting 10 for supporting at least a user thereon, the floor matting comprising a compressible layer 30 for absorbing at least a portion of a weight of the user, the compressible layer 30 being tapered about at least a portion of a periphery 32 thereof. Also included is a frame member 40 disposed upon at least the tapered peripheral portion 32 of the compressible layer 30 such that portions of the frame member 40 that are disposed upon the tapered peripheral portion 32 of the compressible layer 30 assume an angled orientation of the tapered peripheral portion 32 of the compressible layer 30. A non-slip outer layer is 20 disposed upon and bonded to the frame member 40 such that at least the portions of the frame member 40 that are disposed upon the tapered peripheral portion 32 of the compressible layer 30 are sandwiched between the outer layer 20 and the tapered peripheral portion 32 of the compressible layer 30 and the outer layer 20 covers substantially all and overhangs at least a portion of the compressible layer 30, the outer layer 20 being more flexible than the frame member 40 and at least a portion of a periphery of the outer layer 20 assumes an angled orientation as a result of being positioned upon the frame member 40 and the tapered peripheral portion 32 of the compressible layer 30. The frame member 40 provides rigidity to the outer layer 20 so as to prevent roll-up of the outer layer during use of the floor matting. That part of the outer layer 20 which overhangs beyond an edge of the compressible layer 30 forms an air gap between the underside of the outer layer and the floor when the floor mating is placed upon the floor.

The angled rigid vinyl strip 40 may be bonded between the top vinyl surface 20 and the beveled or angled sponge perimeter 32 which is the next layer down contacting the floor 50 with the sponge bottom surface 34. In other words, as noted above, the rigid strip 40 may be sandwiched between the vinyl surface 20 and the angled sponge perimeter 32 as illustrated in FIG. 3. It is noted that the sponge layer 30 may be composed of resilient foam material, such as polyurethane (PU) open cell, PU closed cell, Polyvinyl Chloride (PVC) open cell, PVC closed cell or a similar material. Other resilient foam materials are possible to be used.

In one construction of the matting 10, several advantageous features and characteristics are obtained. The matting 10 can be manufactured in long lengths greater than 30 feet and can roll up, inward to its bottom side for economical shipping to a customer and cleaning after use. In a preferred construction of matting 10, the imbedded, angled, rigid vinyl strip just inside its perimeter prevents rolling upwards into the top surface direction. Hence, the bunching and curling up problems, which cause premature wear and tripping hazards in conventional matting, do not occur with the matting 10 under normal use conditions.

The matting 10 is a generally horizontal surface that may be constructed of a variety of materials. In one construction, matting 10 provides for maximum therapeutic comfort of an operator or operators of equipment. In such a case, the matting may be a multi-layer construction to include a non-slip work surface layer 20 and a resilient compressible core 30. The construction of the matting can reduce the stress of standing by approximately 40%. In a preferred use, a standing position of a person in combination with a matting places less compressive strain on the spinal vertebrae than a sitting position. The matting 10 can be used in many environments, such as in maintenance operations, manufacturing operations, assembly line operations, retail, and other working conditions. To accommodate the various numerous uses, the matting 10 may be provided in a rectangle in different lengths and widths. Other shapes are possible. The lengths may range from 3 feet to 30 feet or more to accommodate various operational conditions. The widths of matting 10 may be provided in 3 to 5 feet or more. Certain matting surfaces may be provided with special coatings allowing for conductive matting grounding or non-conductivity. In one example, a conductive coating is attached to a grounding wire.

It is believed that matting 10 is the first resilient foam core product that can be provided as a rolled good product which provides rigidity to serve as a consistent lasting flooring system.

Figure 6A:
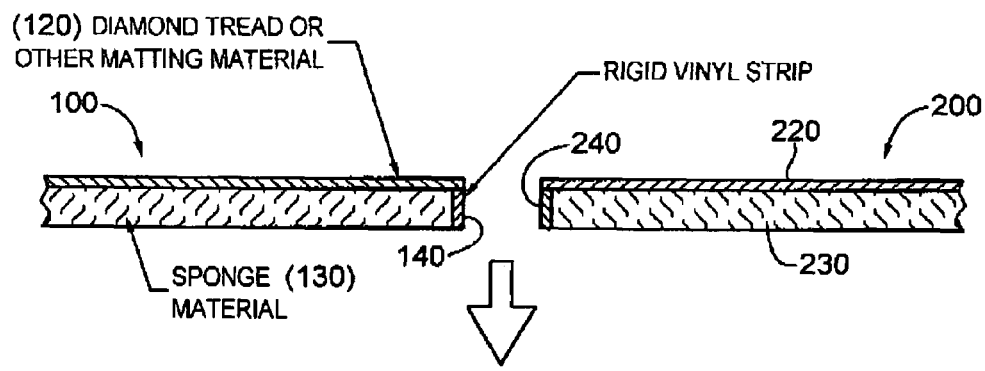
FIGS. 6A and 6B are partial sectional views of an embodiment of a matting product with an end configuration useful of a manufacturing method according to the teachings of the present invention.
Figure 6B:
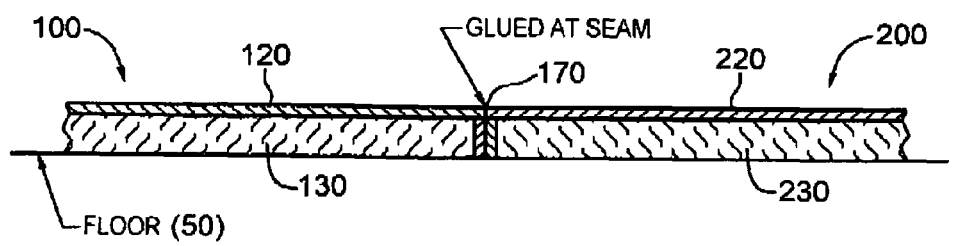

Referring to FIGS. 6A and 6B, an alternative embodiment of a matting construction 100, 200 is provided with similar features as matting 10, except that a distal end construction readily enables reliable joining and other purposes for manufacturing. Matting construction/section 100, 200 have a multilayer thickness for supporting at least a human body thereon, the multilayer thickness may have a non-slip outer/top layer 120, 220, a resiliently compressible layer 130, 230; and a frame member 140, 240, such as a rigid or semi-rigid strip of vinyl. Rather than having an acute angled edge as shown in FIG. 3, a distal end of the matting 100, 200 has a generally straight edge configuration at one or more ends. In one example, shown in FIG. 6A, frame member 140, 240 is disposed upright in a generally perpendicular configuration with respect to the floor or the underside of the top layer 120. Frame member 140 is fixedly attached to the underside of the top layer 120 and a side of the compressible layer 130, 230 by a bonding agent, such as a cyanoacrylate adhesive. This forms an end configuration with a generally "square" end for joining matting sections 100, 200 together. To join the two matting sections 100, 200 together, a bonding agent may be applied to the exposed surface of the frame member 140, 240. In FIG. 613, the two ends are placed in an abutting relation where a seam 170 is formed. Then a bonding agent may be applied to the seam to join the two matting sections 100, 200 together. In another configuration, the squared ends of the matting sections 100, 200 can be placed in an abutting relationship without bonding the ends together. In this way, the matting sections can be moved in different locations, if desired.

Figure 8:
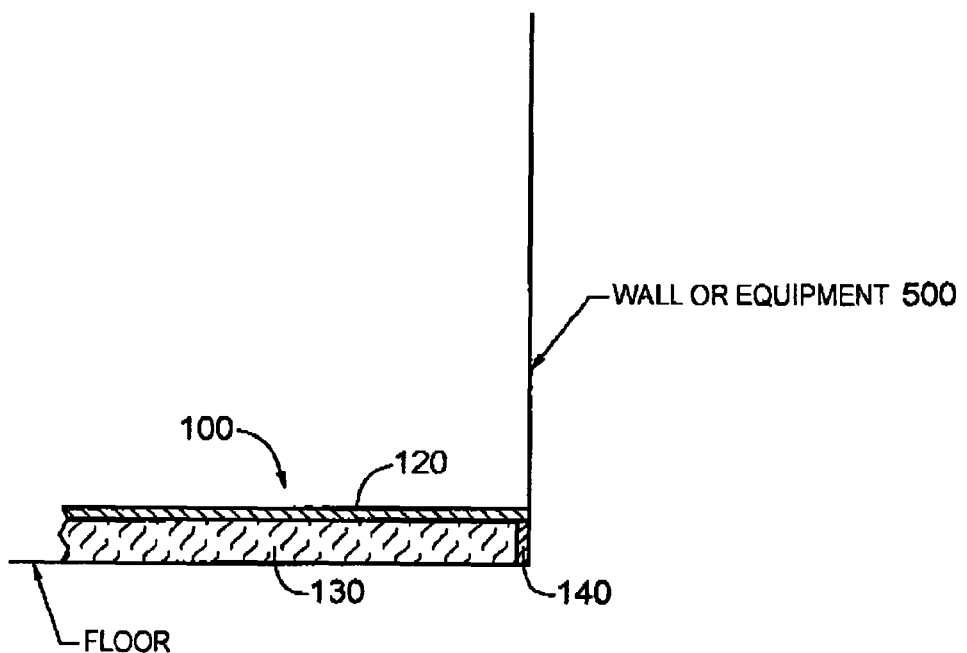
FIG. 8 is a partial section view of an embodiment of a matting product in FIG. 6A in one operational configuration.

As shown in FIG. 8, the squared end configuration of matting section 100 can be used to place the matting section 100 generally flush against a wall or equipment 500. This square end configuration forms a rigid structure to support weight of a user or object placed at the end of the matting 100.

Figure 7A:
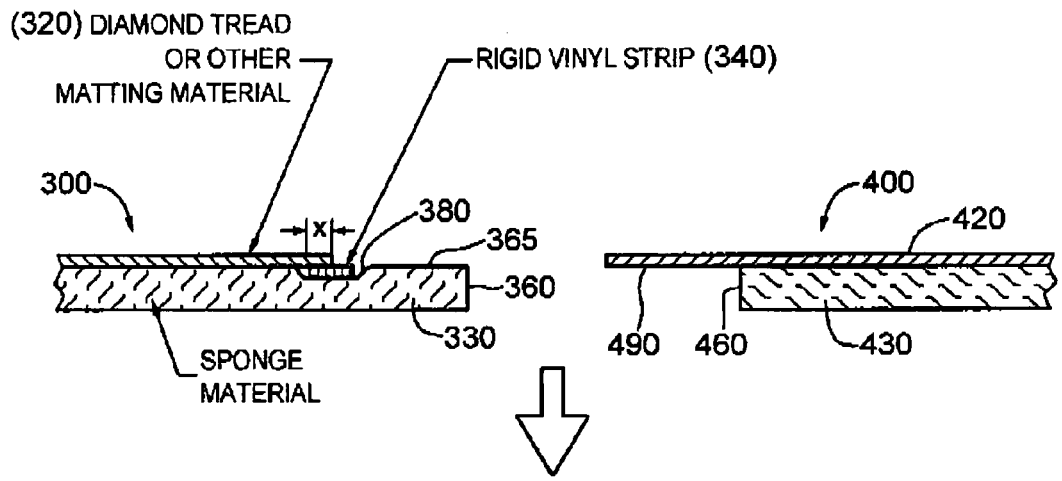
FIGS. 7A and 7B are partial sectional views of an embodiment of a matting product with an end configuration useful of a manufacturing method according to the teachings of the present invention.
Figure 7B:
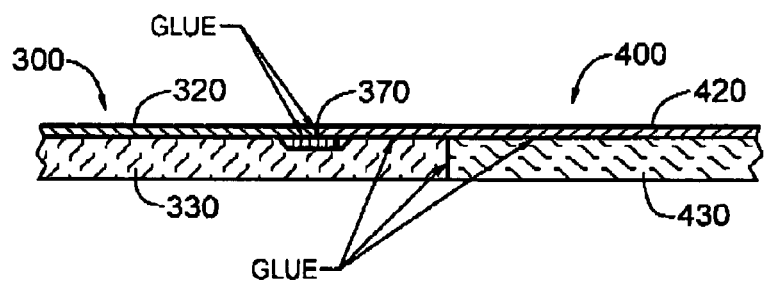

Referring to FIGS. 7A and 7B, an alternative embodiment of a matting construction/section 300, 400 is provided with similar features as matting 10, except that a distal end construction readily enables reliable joining and other purposes for manufacturing. Matting construction 300, 400 has a multilayer thickness for supporting at least a human body thereon, the multilayer thickness may have a non-slip outer/top layer 320, 420, a resiliently compressible layer 330, 430; and a frame member 340, such as a rigid or semi-rigid strip of vinyl. In this embodiment, a tongue and groove configuration or overlapping configuration is provided for joining the two matting sections 300, 400 together. As seen in FIGS. 7A and 7B, in the matting section 300, a recessed channel 380 is provided so as to retain the frame member 340 therein. A portion of the frame member is off-set and bonded to the underside of the top layer 320. In other words, the frame member 340 (or a portion thereof where, for instance, a four-sided mat as illustrated in FIG. 1 includes three sides that are tapered as detailed above and one side that is to be interconnected with an adjoining mat as illustrated in FIGS. 7A and 7B) is disposed upon a top (e.g., flat) portion of the compressible layer 330 so as to be offset from an edge of the outer layer 320. For example, the frame member portion 340 may be disposed in a recessed channel 380 defined by the top portion of the compressible layer 330 such that part of the frame member portion 310 is offset from an edge forming part of the channel 380 as shown in FIG. 7A. With this construction, the frame member portion 340 is only partially bonded to the outer layer 320 along a length of the frame member portion 340 (i.e., one part of the frame member portion 340 is bonded to the outer layer 320 and another part of the frame member portion 340 is not bonded to the outer layer 320 as shown in FIG. 7A). The portion of the frame member 340 that is bonded to the underside of the outer layer 320 can have a length X of about ¼ of an inch with respect to a longitudinal axis of the matting section 300. Nevertheless, other lengths could be used. The upper end of the matting section 300 does not have a top layer 320 so as to form a receiving structure for matting section 400

As shown in FIG. 7A, matting section 400 has an extended portion 490 of top layer 420 which will fit into the receiving structure of matting section 300. To join the two matting sections 300, 400 together, a bonding agent may be applied to the exposed surface of the frame member 340 and ends 360, 460 of the compressible layer 330, 430. Further, a bonding agent is applied to the exposed upper surface 365 of the compressible layer 330. In FIG. 7B, the two sections 300, 400 are placed in an abutting relation where a seam 370 is formed. Then a bonding agent may be applied to the seam to join the two matting sections 300, 400 together. This joining configuration has an advantage of providing user comfort as well as providing a reliable joint. The frame member 340 serves as a structure for joining matting sections together and, when stepped, on by a user, the frame member is compressed in the compressible layer 340 due to the weight of the user. Hence, user comfort is provided by the inventive matting product.

More particularly, the system for joining two multilayer floor matting sections comprising two multilayer floor matting sections as shown in FIGS. 7A and 7B provides for joining two sections which are the same as the matting section shown in FIG. 2 except that at least one end of the first section is not tapered but is configured as shown on the left half of FIG. 7A and at least one end of the second section is not tapered but is configured as shown on the right half of FIG. 7A.

A first multilayer floor matting section 300 includes a first compressible layer 330 for absorbing at least a portion of a weight of the user, the first compressible layer 330 being tapered about a portion of a periphery thereof (as in FIG. 2), the first compressible layer 330 further having a generally straight edge configuration 360 at one or more ends thereof. A first frame member is disposed upon the tapered peripheral portion of the first compressible layer, wherein the first frame member assumes an angled orientation corresponding generally to an angle of the tapered peripheral portion of the first compressible layer as shown in FIG. 3. A recessed frame member 340 is disposed within a recessed channel 380 in a top portion of the first compressible layer 330, the channel 380 being parallel to and located at a selected distance from the generally straight edge 360 of the first compressible layer 330, as shown in FIG. 7A. A first non-slip outer layer 320 is disposed upon and bonded to the first compressible layer 330, the first frame member and about one half of the width of a top surface of the recessed frame member 340, leaving a portion 365 of the first compressible layer 330 between the second frame member and the generally straight edge 360 exposed. The first frame member is sandwiched between the first outer layer and the tapered peripheral portion of the first compressible layer. At least a portion of a periphery of the first outer layer assumes an angled orientation as a result of being positioned upon the first frame member and the tapered peripheral portion of the first compressible layer. The first frame member provides rigidity to the first outer layer so as to prevent roll-up of the first outer layer during use of the first floor matting section. The first outer layer overhangs the tapered peripheral portion of the first compressible layer and forms a first air gap between an underside of the first outer layer and a floor when the first floor matting section is placed upon the floor.

A second multilayer floor matting section includes a second compressible layer 430 for absorbing at least a portion of a weight of the user, the second compressible layer 430 being tapered about a portion of a periphery thereof. The second compressible layer 430 also has a generally straight edge configuration 460 at one or more ends thereof. A second frame member is disposed upon the tapered peripheral portion of the second compressible layer and the second frame member assumes an angled orientation corresponding generally to an angle of the tapered peripheral portion of the second compressible layer as shown in FIG. 3. A second non-slip outer layer 420 is disposed upon and bonded to the second compressible layer 430 and the second frame member. A portion 490 of the second non-slip layer 420 extends beyond a top edge of the generally straight edge 460 of the second compressible layer 430, as shown in FIG. 7A. The second frame member is sandwiched between the second outer layer and the tapered peripheral portion of the second compressible layer with at least a portion of a periphery of the second outer layer assuming an angled orientation as a result of being positioned upon the second frame member and the tapered peripheral portion of the second compressible layer. The second frame member provides rigidity to the second outer layer so as to prevent roll-up of the second outer layer during use of the second floor matting section. The second outer layer overhangs the tapered peripheral portion of the second compressible layer and forms a second air gap between an underside of the second outer layer and the floor when the second floor matting section is placed upon the floor.

The generally straight edge 360 of the first floor matting section 300 abuts the generally straight edge 460 of the second floor matting section 400. The portion 490 of the second non-slip layer 420 extending beyond a top edge of the generally straight edge 460 of the second compressible layer 430 overlays the exposed about one half of the width of the recessed frame member 340 and the portion 365 of the first compressible layer 330 between the recessed frame member 340 and the generally straight edge 360. All abutting and overlaying surfaces are bonded one another thereto. The recessed frame member provides rigidity to the abutting surfaces and edges of the first non-slip outer layer and the second non-slip outer layer when walked on by a user.

In another example manufacturing method, the frame member 340 can be used as a glue joining strip between the two sections of matting. In such a construction, both sponge layers 330, 430 of the matting sections 300, 400 have recess portions that can be placed together to collectively form a larger recess or trough arrangement. The frame member 340 can be placed in the larger recess for joining the two matting sections 300, 400 together. It is noted that member 340 could be placed in the center of the larger recess. Then a bonding agent can be applied to ends of the sponge material and top layer of the matting sections. Thus, similar to the embodiment discussed above with respect to FIGS. 7A and 7B, frame member portion 340 may be disposed upon a top (e.g., flat) portion of the compressible layer 330 so as to be offset from an edge of the outer layer 320 of one of the matting sections (e.g., matting section 300). For example, the frame member portion 340 may be disposed in the edge recess or trough defined by the top portion of the compressible layer 330 for matting section 300 such that part of the frame member portion 340 is offset from an edge of the matting portion 300. With this construction, the frame member portion 340 is only partially bonded to the outer layer 320 along a length of the frame member portion 310 (i.e., one part of the frame member portion 340 is bonded to the outer layer 320 and another part of the frame member portion 340 is not bonded to the outer layer 320 in a manner similar to that shown in FIG. 7A, except that the non-bonded part of the frame member portion 340 extends beyond the edge of the compressible layer 330 of matting section 300 instead of remaining in a channel or recess defined by the compressible layer 330). The non-bonded part of the frame member portion 340 would then be bonded to the outer layer 420 and compressible layer 430 of the mating matting section 400 (e.g., within the complementary recess or trough defined by the mating matting section 400) when the two matting sections 300, 400 are joined.

As further illustrated in FIG. 3, 7A, and 7B, a multilayer floor matting system supports at least a user thereon and includes at least two multilayer floor matting sections 300, 400. A first floor matting section 300 includes a compressible layer 330 that is tapered about a portion 32 of a periphery thereof (e.g., as illustrated in FIG. 3), a frame member 40 disposed upon the tapered peripheral portion 32 of compressible layer 330, another frame member 340 disposed upon a top portion of compressible layer 330, and a non-slip outer layer 320 disposed upon and bonded to compressible layer 330, frame member 40, and frame member 340 such that frame member 40 is sandwiched between outer layer 320 and the tapered peripheral portion 32 of compressible layer 330. Outer layer 320 covers substantially all and overhangs at least a portion of compressible layer 330 (e.g., as does the outer layer 20 depicted in FIG. 3). Compressible layer 330 absorbs at least a portion of a weight of the user and has a generally straight edge configuration at one or more ends 360 thereof (e.g., as illustrated in FIG. 7A). Frame member 40 assumes an angled orientation corresponding generally to an angle of the tapered peripheral portion 32 of compressible layer 330. Outer layer 320 is more flexible than frame member 40 and at least a portion of a periphery of outer layer 320 assumes an angled orientation as a result of being positioned upon frame member 40 and the tapered peripheral portion 32 of compressible layer 330 (e.g., as illustrated in FIG. 3). Frame member 40 provides rigidity to outer layer 320 so as to prevent roll-up of outer layer 320 during use of floor matting section 300. An overhang of outer layer 320 beyond the tapered peripheral portion 32 of compressible layer 330 forms an air gap between an underside of outer layer 320 and a floor 50 when floor matting section 300 is placed upon the floor 50 (e.g., as illustrated in FIG. 3). Frame member 340 is positioned so as to be offset from an edge of outer layer 320 (e.g., as illustrated in FIG. 7A) such that frame member 340 is only partially bonded to outer layer 320 along a length of frame member 340.

A second floor matting section 400 of the multilayer floor matting system abuts floor matting section 300. Floor matting section 400 includes a compressible layer 430 that is tapered about a portion 32 of a periphery thereof, a frame member 40 disposed upon compressible layer 430 such that at least a portion of frame member 40 is disposed upon the tapered peripheral portion 32 of compressible layer 430, and a non-slip outer layer 420 disposed upon and bonded to compressible layer 430 and frame member 40 such that frame member 40 is sandwiched between outer layer 420 and the tapered peripheral portion 32 of compressible layer 430. Compressible layer 430 absorbs at least a portion of a weight of the user and has a generally straight edge configuration at one or more ends 460 thereof. A straight edge 460 of compressible layer 430 abuts a straight edge 360 of compressible layer 330 (e.g., as illustrated in FIG. 7B). When positioned upon the tapered peripheral portion 32 of compressible layer 430, frame member 40 assumes an angled orientation of the tapered peripheral portion 32 of compressible layer 430. Outer layer 420 covers substantially all and overhangs at least a portion of compressible layer 430 (e.g., as illustrated in FIG. 3). Outer layer 420 is further bonded to frame member 340 at locations where frame member 340 is offset from an edge of outer layer 320 (e.g., as illustrated in FIGS. 7A and 7B). Outer layer 420 is more flexible than frame member 40 and at least a portion of a periphery of outer layer 420 assumes an angled orientation as a result of being positioned upon frame member 40 and the tapered peripheral portion 32 of compressible layer 430 (e.g., as illustrated in FIG. 3). Frame member 40 provides rigidity to outer layer 420 so as to prevent roll-up of outer layer 420 during use of floor matting section 400. An overhang of outer layer 420 beyond the tapered peripheral portion 32 of compressible layer 430 forms an air gap between an underside of outer layer 420 and the floor 50 when floor matting section 400 is placed upon the floor 50.

Figure 9:
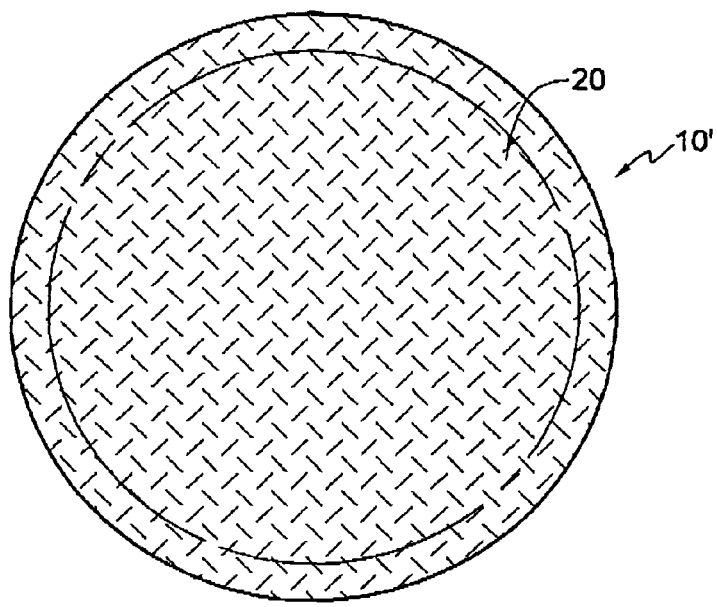
FIG. 9 is alterative embodiment shape of a matting product according to the teaching of the present invention.
Figure 10:
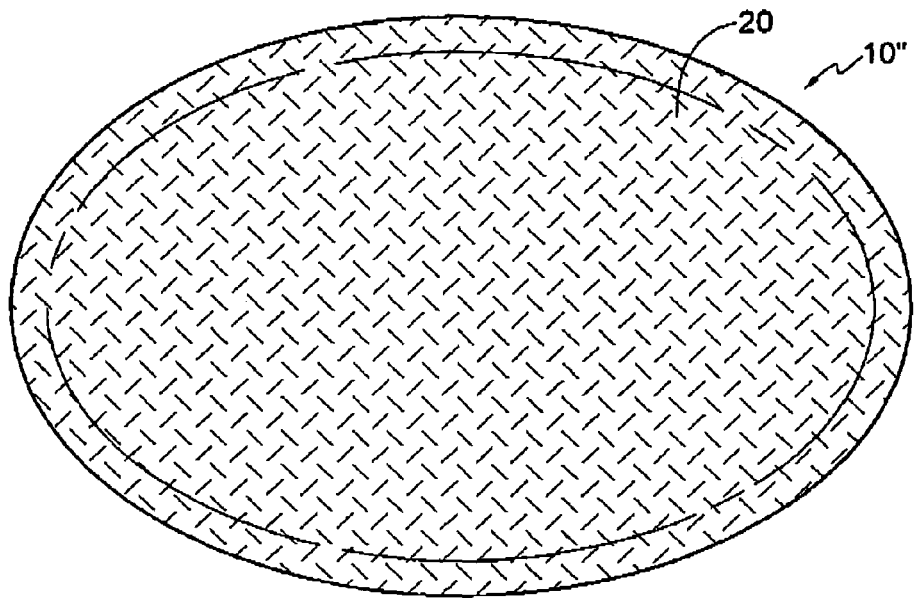
FIG. 10 is alterative embodiment shape of a matting product according to the teaching of the present invention.

It is noted that the features of the matting 10, 100, 200, 300, 400 individually and/or in any combination, improve stability of matting, improve workplace safety and productivity; while reducing trauma or other injury, such as musculoskeletal fatigue while promoting circulation for a user thereon. While the various features and aspects of matting 10, 100, 200, 300, 400 work together to achieve the advantages previously described, it is recognized that individual features and subcombinations of these features can be used to obtain some of the aforementioned advantages without the necessity to adopt all of these features. The matting 10, 100, 200, 300, 400 can he provided in different shapes, such as polygonal, square, rectangular, circle 10', oval 10", and the like (see FIGS. 9 and 10). For a polygon shape, one or more sides may have an angled end configuration as shown in FIG. 3 or other end configuration as shown in FIG. 8. The matting product can be made in multiple sections and joined together such as shown. in FIGS. 6A-6B and 7A-7B.

For example, matting 10 may include an outer layer 20 which enables a user to ambulate without slipping thereon; a compressible layer 30 for absorbing at least a portion of the weight of the user, and a peripheral frame member 40 disposed between the outer layer 20 and the compressible layer 30.

In another example, matting 10 may include a multilayer thickness for supporting at least a user thereon, the multilayer thickness may have an outer layer 20 which enables a user to ambulate thereon, a compressible layer 30, and a peripheral frame member 40 disposed at an angle θ to the horizontal and the frame member is fixedly attached between the outer layer 20 and the compressible layer 30.

While matting product has been described and shown with reference to preferred and exemplary constructions, there are any number of alternative combinations that can be provided.

For example, matting 10 may have an air bonding means for a floor surface 50. The matting construction may have a multilayer thickness with an outer layer 20 that enables a user to ambulate thereon, a compressible layer 30, and a peripheral frame member 40 fixedly attached between the outer layer 20 and the compressible layer 30.

In another example, a matting construction 10 includes a rigid vinyl spine, open or closed cell sponge, and a durable runner top layer. This construction provides enhanced performance, comfort for users and protection on floors surfaces.

While the matting has been described and shown with reference to preferred and exemplary construction, there are any number of alternative combinations for defining the invention, which incorporate one or more elements from the specification, including the description, and drawings, in various combinations or sub combinations. It will be apparent to those skilled in the relevant technology, in light of the present specification, that alternate combinations of aspects of the invention, either alone or in combination with one or more elements defined herein, may be utilized as modifications or alterations of the invention or as part of the invention.

The invention claimed is:

1. A system for joining two multilayer floor matting sections comprising:
   a first multilayer floor matting section including:
   a) a first compressible layer for absorbing at least a portion of a weight of the user, said first compressible layer being tapered about a portion of a periphery thereof, said first compressible layer further having a generally straight edge configuration at one or more ends thereof;
   b) a first frame member disposed upon said tapered peripheral portion of said first compressible layer, wherein said first frame member assumes an angled orientation corresponding generally to an angle of said tapered peripheral portion of said first compressible layer;
   c) a recessed frame member disposed within a recessed channel in a top portion of said first compressible layer, said channel being parallel to and located at a selected distance from said generally straight edge of said first compressible layer; and
   d) a first non-slip outer layer disposed upon and bonded to said first compressible layer, said first frame member and about one half of the width of a top surface of said recessed frame member, leaving a portion of said first compressible layer between said second frame member and said generally straight edge exposed, said first frame member being sandwiched between said first outer layer and said tapered peripheral portion of said first compressible layer, at least a portion of a periphery of said first outer layer assuming an angled orientation as a result of being positioned upon said first frame member and said tapered peripheral portion of said first compressible layer, said first frame member providing rigidity to said first outer layer so as to prevent roll-up of said first outer layer during use of said first floor matting section, said first outer layer overhanging said tapered peripheral portion of said first compressible layer and forming a first air gap between an underside of said first outer layer and a floor when said first floor matting section is placed upon said floor;
   a second multilayer floor matting section including:
   a) a second compressible layer for absorbing at least a portion of a weight of said user, said second compressible layer being tapered about a portion of a periphery thereof, said second compressible layer further having a generally straight edge configuration at one or more ends thereof;

b) a second frame member disposed upon said tapered peripheral portion of said second compressible layer, said second frame member assuming an angled orientation corresponding generally to an angle of the tapered peripheral portion of said second compressible layer;

c) a second non-slip outer layer disposed upon and bonded to said second compressible layer and said second frame member; a portion of said second non-slip layer extending beyond a top edge of the generally straight edge of said second compressible layer, said second frame member being sandwiched between said second outer layer and said tapered peripheral portion of said second compressible layer, at least a portion of a periphery of said first outer layer assuming an angled orientation as a result of being positioned upon said second frame member and said tapered peripheral portion of said first compressible layer, said second frame member providing rigidity to said second outer layer so as to prevent roll-up of said second outer layer during use of said second floor matting section, said second outer layer overhanging said tapered peripheral portion of said second compressible and forming a second air gap between an underside of said second outer layer and said floor when said first floor matting section is placed upon said floor; and d) said generally straight edge of said first floor matting section abutting said generally straight edge of said second floor matting section, said portion of said second non-slip layer extending beyond a top edge of said generally straight edge of said second compressible layer overlays said exposed about one half of said width of said recessed frame member and said portion of said first compressible layer between said recessed frame member and said generally straight edge, all abutting and overlaying surfaces being bonded one another thereto, said recessed frame member providing rigidity to said abutting surfaces and edges of said first non-slip outer layer and said second non-slip outer layer when walked on by a user.

2. The system in accordance with claim 1, wherein the angled orientation assumed by the first and second frame members is an angle in a range from 2 to 45 degrees relative to a horizontal bottom surface of the respective first and second compressible layers.

3. The system in accordance with claim 1, wherein the first air gap and the second air gap create respective suction pockets for attaching the first floor matting section and the second floor matting section to the floor.

4. The system in accordance with claim 1, wherein the first compressible layer and the second compressible layer each comprises a foam material.

5. The system in accordance with claim 1, wherein the first frame member and second frame member each comprises a vinyl material.

6. The system in accordance with claim 1, wherein each of the first frame member and the second frame member is a rigid strip having a width of about ½ to ¾ inches.

7. A floor matting, comprising:
at least one layer of compressible material including a tapered portion extending around a periphery of said layer of compressible material at a selected angle;
a strip of rigid plastic material defining a frame member disposed upon said tapered portion of said at least one layer of compressible material at said selected angle;
a flexible non-slip outer layer disposed upon and bonded to an upper surface of at least a periphery of said at least one layer of compressible material, and bonded to an upper surface of said frame member wherein said frame member is disposed between said flexible non-slip outer layer and said tapered portion of said at least one layer of compressible material;
said flexible non-slip outer layer extending over and past said at least one layer of compressible material, said flexible non-slip layer covering and overhanging said at least one layer of compressible material;
said flexible non-slip outer layer having an edge extending to said floor at said selected angle; and
wherein said strip of rigid plastic material provides rigidity to said flexible non-slip outer layer so as to prevent roll-up of said outer layer during use of said floor matting and creates a suction-like pressure between said outer layer and, said floor.

8. The floor matting in accordance with claim 7, wherein the at least one layer of compressible material has a generally straight edge configuration at one or more ends thereof.

9. The floor matting in accordance with claim 7, wherein the angle ranges between 2 to 45 degrees.

10. The floor matting in accordance with claim 7, wherein the angle ranges between 10 to 30 degrees.

11. The floor matting in accordance with claim 7, wherein said at least one layer of compressible material comprises a foam material.

12. The floor matting in accordance with claim 8, wherein an edge of the outer layer coincides with a generally straight edge of said at least one layer of compressible material along a generally straight edge of said at least one layer of compressible material.

13. The floor matting in accordance with claim 7, wherein a second portion of the frame member is disposed upon a top portion of said at least one layer of compressible material and positioned so as to be offset from an edge of the outer layer, such that the second portion of said frame member is bonded to the outer layer along a length of the second portion of said frame member.

14. The floor matting in accordance with claim 7 wherein a section of the second portion of said frame member that is not bonded to the outer layer extends outwardly beyond and edge of the outer layer.

15. The floor matting in accordance with claim 7, wherein a portion of said upper surface of the at least one layer of compressible material defining a channel and at least a portion of said frame member is disposed within the channel.

16. The floor matting in accordance with claim 7 wherein said at least one layer of compressible material comprises a foam material having an open cell structure.

17. The floor matting in accordance with claim 7 wherein said at least one layer of compression material comprises a foam material having a closed cell structure.

18. The floor matting in accordance with claim 7 wherein said at least one layer of compression material comprises at least one layer of an open cell material and at least one layer of a closed cell material.

19. The floor matting of claim 18, wherein said at least one layer of open cell material is disposed on top of said at least one layer of closed cell material.

* * * * *